(12) United States Patent
Murata et al.

(10) Patent No.: US 8,117,349 B2
(45) Date of Patent: Feb. 14, 2012

(54) INFORMATION PROCESSING APPARATUS

(75) Inventors: Akikazu Murata, Gifu-ken (JP); Hirofumi Oguri, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 135 days.

(21) Appl. No.: 12/363,739

(22) Filed: Jan. 31, 2009

(65) Prior Publication Data

US 2009/0198838 A1 Aug. 6, 2009

(30) Foreign Application Priority Data

Jan. 31, 2008 (JP) ................. 2008-020374

(51) Int. Cl.
*G06F 3/00* (2006.01)
(52) U.S. Cl. ................... 710/8; 710/10; 710/14; 710/15
(58) Field of Classification Search .................. None
See application file for complete search history.

(56) References Cited

U.S. PATENT DOCUMENTS

| | | | |
|---|---|---|---|
| 6,567,627 B2 | 5/2003 | Maeda et al. | |
| 6,785,487 B2 | 8/2004 | Maeda et al. | |
| 6,978,096 B2 | 12/2005 | Maeshima | |
| 2004/0170443 A1 | 9/2004 | Maeshima | |
| 2005/0111866 A1 | 5/2005 | Sato | |
| 2006/0083533 A1 | 4/2006 | Maeshima | |
| 2006/0087680 A1* | 4/2006 | Maeda ......................... | 358/1.15 |
| 2006/0187483 A1* | 8/2006 | Baba ............................ | 358/1.15 |
| 2008/0030818 A1* | 2/2008 | Nagahara et al. ............. | 358/537 |
| 2008/0291485 A1* | 11/2008 | Kimoto et al. ................ | 358/1.15 |
| 2009/0128859 A1* | 5/2009 | Daos et al. .................... | 358/3.28 |

FOREIGN PATENT DOCUMENTS

| | | |
|---|---|---|
| JP | H08-097900 A | 4/1996 |
| JP | H11-017852 A | 1/1999 |
| JP | 2002-354170 A | 12/2002 |
| JP | 2004-266408 A | 9/2004 |
| JP | 2005-153346 A | 6/2005 |
| JP | 2005-246900 A | 9/2005 |
| JP | 2006-041701 A | 2/2006 |
| JP | 2007-301825 A | 11/2007 |

OTHER PUBLICATIONS

Japan Patent Office, Office Action for Japanese Patent Application No. 2008-020374 (counterpart to above-captioned patent application), issued Oct. 4, 2011.

* cited by examiner

*Primary Examiner* — Henry Tsai
*Assistant Examiner* — Kris Rhu
(74) *Attorney, Agent, or Firm* — Baker Botts L.L.P.

(57) ABSTRACT

An information processing apparatus includes a setting unit configured to set a set value group; an executing unit configured to execute a function using the set value group; a history storing unit configured to store history information including the set value group having been used in an execution of the function; a displaying unit configured to display the history information and an operation image corresponding to an operating portion; a specifying unit configured to specify history information and operation image designated by the user; and an assigning unit configured to assign a set value group corresponding to the specified history information to the operating portion corresponding to the specified operation image specified. When a predetermined operation is carried out for the operating portion corresponding to the operation image, the setting unit sets the set value group assigned to the operating portion.

13 Claims, 12 Drawing Sheets

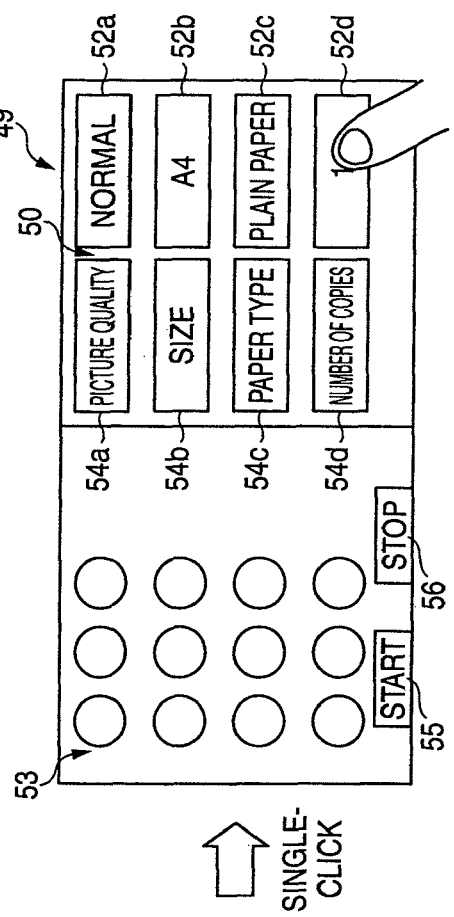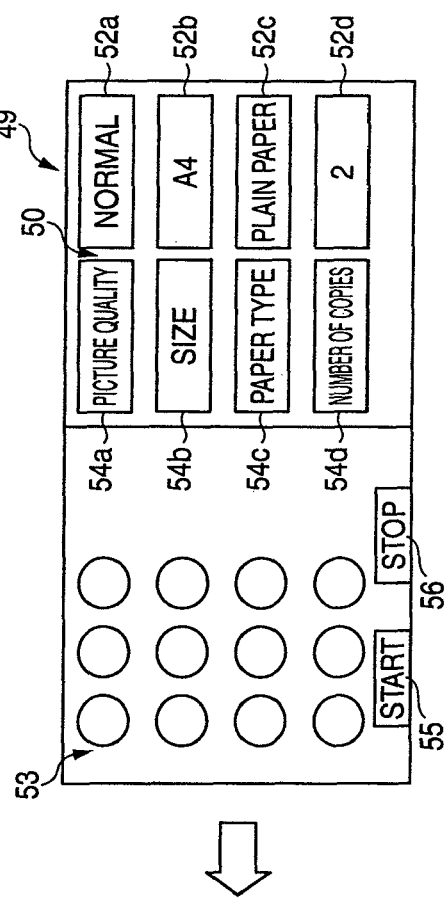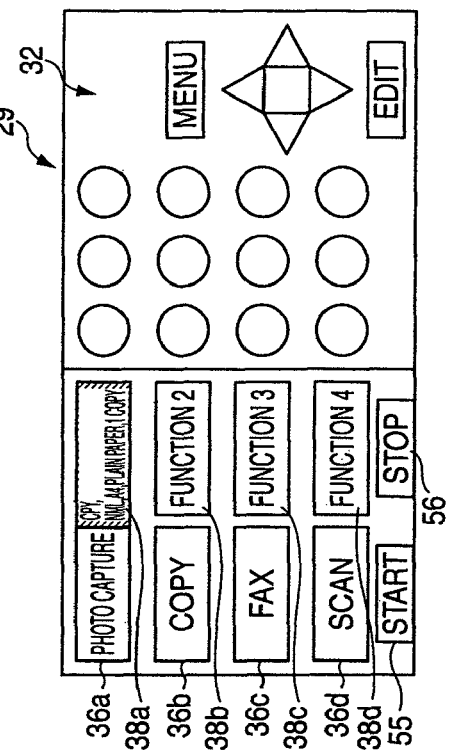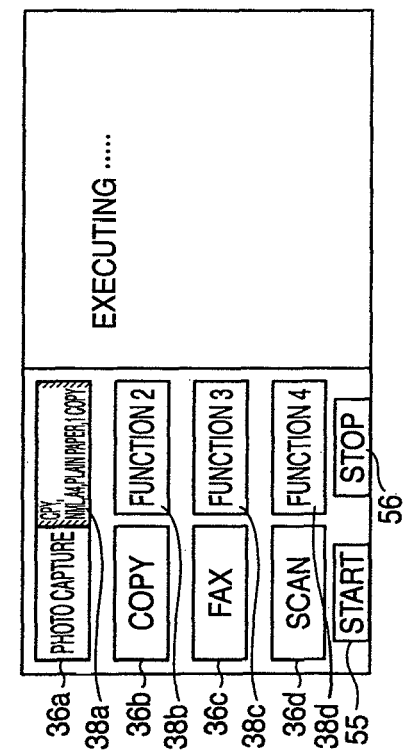

(FIG.7 CONTINUED)
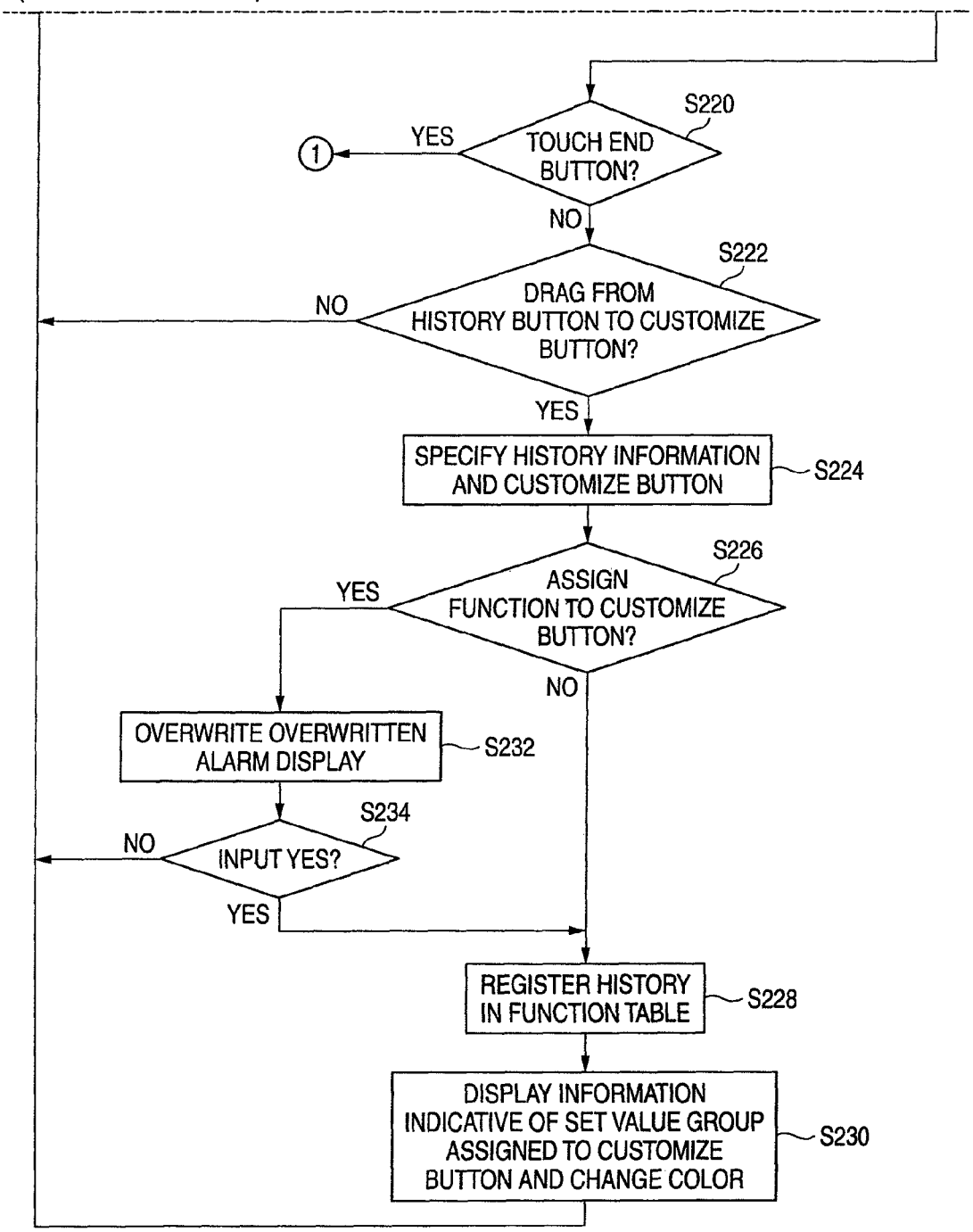

(PROCESSING IN MFP)

(PROCESSING IN MFP)

INFORMATION PROCESSING APPARATUS

CROSS-REFERENCE TO RELATED APPLICATIONS

This application is based upon and claims priority from Japanese Patent Application No. 2008-020374 filed on Jan. 31, 2008, the entire contents of which are incorporated herein by reference.

TECHNICAL FIELD

The present invention relates to an information processing apparatus.

BACKGROUND

A multifunction peripheral device can implements a plurality of functions such as a facsimile function, a printer function, a scanner function and a copy function. The multifunction peripheral device has various set items for specifying operating conditions such as a resolution, a concentration, and a zoom magnification. A user can execute a desirable operation for the device by properly changing a set value of each of the set items. The function which can be implemented by the device is diversified. For this reason, there are a large number of set items, and an operation for setting them one by one is troublesome to the user.

Also in various information processing apparatuses, such as a printer, a facsimile apparatus or a copy apparatus in addition to the multifunction peripheral device, the similar circumstances may be caused when there are a large number of set items for specifying the operating conditions.

JP-A-2006-41701 describes a communicating terminal for storing, as a history, set conditions such as reading and transmitting conditions of a facsimile and registering the set conditions stored in the history in an empty key in order to eliminate a complicatedness of the setting operations which is caused in a facsimile transmission on the same set conditions.

In this communication terminal, when at least a predetermined number of set conditions other than default setting are left in the history, an inquiry about whether the set condition of the history is registered is given to a user and the set condition is registered in the empty key.

However, according to this communication terminal, the set condition stored as the history is not registered in the empty key until a predetermined condition is satisfied. Therefore, a set condition desired by the user may not be always registered in the empty key. If the set condition desired by the user is not registered, a convenience of the key is poor and it is hard to obtain an advantage of an enhancement in an operability.

SUMMARY

The present invention was made in consideration of the above circumstances, and an object thereof is to provide an information processing apparatus having a high operability for a user.

According to an aspect of the invention, there is provides an information processing apparatus comprising: a setting unit configured to set a set value group containing a combination of set values of respective various set items; an executing unit configured to execute a predetermined function by using the set value group set by the setting unit; a history storing unit configured to store history information including a set value group used for executing the function having been executed by the executing unit; a displaying unit configured to display the history information together with an operation image corresponding to an operating portion; a specifying unit configured to specify the history information and operation images displayed by the displaying unit which is designated by the user; and an assigning unit configured to assigning a set value group corresponding to the history information specified by the specifying unit to the operating portion corresponding to the operation image specified by the specifying unit, wherein the setting unit sets the set value group assigned to the operating portion when a predetermined operation is carried out for the operating portion corresponding to the operation image.

According to another aspect of the invention, there is provided a method for controlling an information processing apparatus that comprises: a setting unit configured to set a set value group containing a combination of set values of various set items; and an executing unit configured to execute a function using the set value group set by the setting unit, said method comprising: storing history information including the set value group having been used in an execution of the function by the executing unit; displaying the history information and an operation image corresponding to respective operating portions configured to receive an instruction from a user; specifying history information and operation image designated by the user from the history information and the operation image displayed by a displaying unit; assigning a set value group corresponding to the specified history information to the operating portion corresponding to the specified operation image; and setting, the set value group assigned to the operating portion when a predetermined operation is carried out for the operating portion corresponding to the operation image.

According to still another aspect, there is provided a computer-readable medium having a computer program stored thereon and readable by a computer, said computer program, when executed by the computer, causes the computer to perform operations for an information processing apparatus that comprises: a setting unit configured to set a set value group containing a combination of set values of various set items; and an executing unit configured to execute a function using the set value group set by the setting unit, said operations comprising: storing history information including the set value group having been used in an execution of the function by the executing unit; displaying the history information and an operation image corresponding to respective operating portions configured to receive an instruction from a user; specifying history information and operation image designated by the user from the history information and the operation image displayed by a displaying unit; assigning a set value group corresponding to the specified history information to the operating portion corresponding to the specified operation image; and setting, the set value group assigned to the operating portion when a predetermined operation is carried out for the operating portion corresponding to the operation image.

BRIEF DESCRIPTION OF THE DRAWINGS

FIGS. 4A to 4D are views showing a user operation for a customize button and which processing is to be executed in the MFP as a result of the user operation;

FIGS. 11A and 11B show a set button display region according to modified embodiments, in which FIG. 11A shows the set button display region in which a customize button is classified by a color for each function, and FIG. 11B shows the set button display region in which the customize button is rearranged every function.

DESCRIPTION

Figure 1:
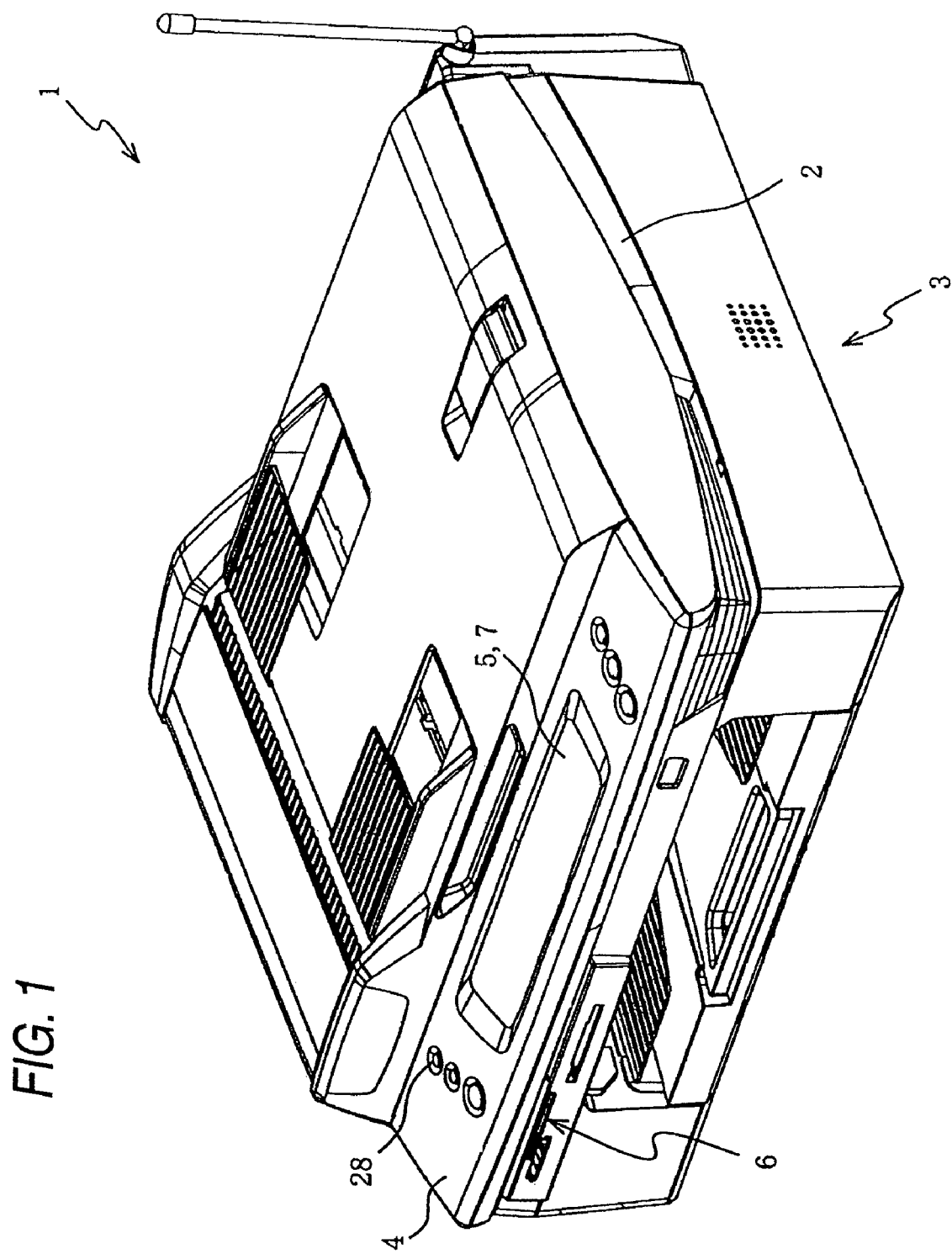
FIG. 1 is a perspective view showing an external structure of an MFP according to a first embodiment.

Embodiments according to the invention will be described below with reference to the accompanying drawings. FIG. 1 is a perspective external view of a multifunction peripheral device (which will be hereinafter referred to as an "MFP (Multi Function Peripheral)") according to a first embodiment of the invention.

The MFP 1 is a multifunction peripheral device having various functions such as a photocapture function, a copy function, a facsimile function and a scanner function. The MFP 1 can assign one of set value groups having been set to a customize button (an example of an operation image corresponding to an operating portion). Accordingly, the same set value group can be rapidly set by using the customize button, and the MFP 1 can exhibit an excellent operability for a user.

A scanner 2 is disposed in an upper part of the MFP 1 and configured to reading a document in an execution of the facsimile function, the scanner function or the copy function. A mounting glass plate for mounting the document is provided on a lower side of a document cover body. Moreover, a housing mounts a printer 3 including ink jet printer as a device for printing an image on a recording paper.

Furthermore, a memory card slot 6 is provided on a front surface of the MFP 1. Image data read through the scanner function can be stored in a memory card attached to the memory card slot 6. Further, image data can be read from the memory card attached to the memory card slot 6 through the photocapture function and can be printed on the recording paper.

In addition, an operation panel 4 having a horizontal shape is provided in a front part of a document cover body and includes an operation key 28, an LCD 5 and a touch panel 7. The MFP 1 allows the LCD 5 to display an operating procedure or a state of a processing which is executed and to display information corresponding to an operation of the operation key 28 or the touch panel 7.

The touch panel 7 serves as an input device and is arranged on a displaying surface of the LCD 5. When a designating object, such as a finger of a user or a stylus, contacts or is close to a surface of the touch panel 7, the touch panel 7 can detect a position contacted with the designating object as a position designated from an outside.

Various buttons such as a set button 34 and a history display button 42 (see FIG. 3), an operation key and a scroll bar are displayed on the LCD 5, which will be described below in detail. When the user touches the surface of the touch panel 7, the touched position is detected by means of the touch panel 7. Therefore, the MFP 1 can determine that operations for the button, the operation key and the scroll bar which are displayed in the detected position are carried out by the user based on a result of the detection. Accordingly, the MFP 1 can execute various processings corresponding to the operations.

Figure 2:
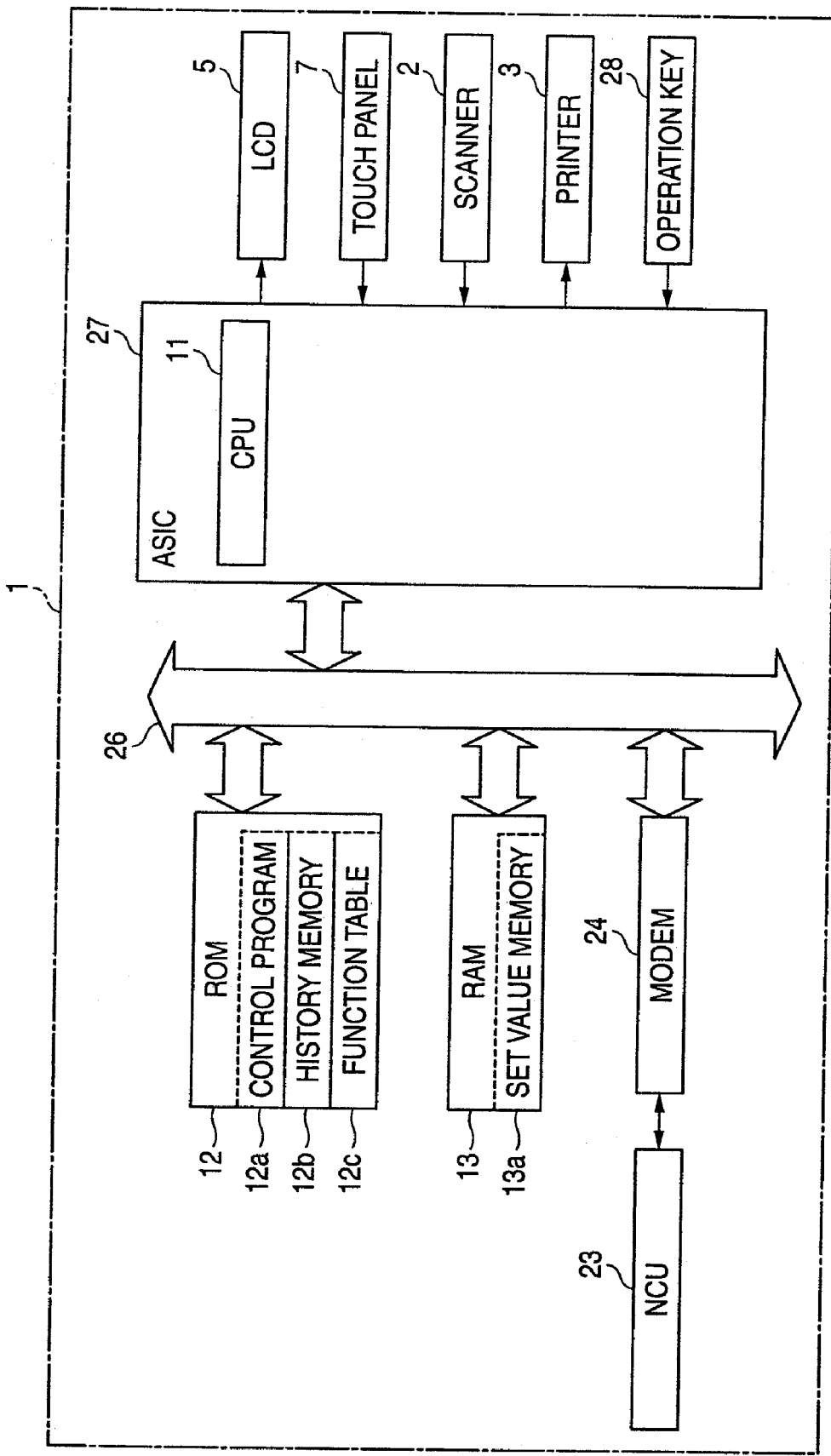
FIG. 2 is a block diagram showing an electrical structure of the MFP.

Next, an electrical structure of the MFP 1 will be described with reference to FIG. 2. FIG. 2 is a block diagram showing an electrical structure of the MFP 1.

In FIG. 2, an ASIC (Application Specific Integrated Circuit) 27 is configured to carry out a control processing in order to execute various functions of the MFP 1 in accordance with a command of a CPU (Central Processing Unit) 11. An ROM 12, an RAM 13 and a modem 24 are connected to the ASIC 27 through an external bus 26. An NCU 23 is connected to the modem 24. The scanner 2, the printer 3, the LCD 5, the touch panel 7 and the operation key 28 are connected to the ASIC 27.

The CPU 11 is configured to control each function possessed by the MFP 1 in accordance with a program stored in the ROM 12.

The ROM 12 is a nonvolatile memory capable of storing a control program 12a to be executed by the CPU 11 and fixed value data, which are rewritable and retainable after a power is turned OFF. The control program 12a includes a program for executing processings shown in flowcharts of FIGS. 6 to 8 which will be described below. In the embodiment, the ROM 12 includes a flash memory.

The ROM 12 further includes a history memory 12b and a function table 12c. When one of the functions of the photocapture function, the copy function, the facsimile function and the scanner function is executed in the MFP 1, the history memory 12b stores a set value group used for the executed function as a history.

For example, in the case in which "copy" is set to be a value of a set item "function", "best mode" is set to be a value of a set item "picture quality mode", "A4" is set to be a value of a set item "paper size", "Normal" is set to be a value of a set item "paper quality", "1" is set to be a value of a set item "number of copies", and the function is executed by using the set value group, history information including a date and time that the function is executed and the set value group "Copy, Normal, A4, 1" used for executing the function is created and stored as a history for the execution of the function in the history memory 12b.

The function table 12c is a memory for storing the set value group to be assigned to a customize button. The details of the function table 12c will be described below with reference to FIG. 5.

The RAM 13 is a rewritable volatile memory and configured to temporarily store various data in the execution of each operation in the MFP 1. The RAM 13 includes a set value memory 13a configured to set a set value group. The MFP 1 executes any of the photocapture function, the copy function, the facsimile function and the scanner function in accordance with the set value group which is set to the set value memory 13a.

The NCU 23 is connected to a telephone network (not shown) and configured to carry out a control such as a transmission of a dial signal to the telephone network and a response of a call signal from the telephone network. The modem 24 is configured to: modulate image data designated as transmission data in the facsimile function into a signal which can be transferred to the telephone network; and transmit the modulated signal through the NCU 23. The modem 24 is also configured to: receive a signal input from the telephone network through the NCU 23; and demodulate the signal into image data which can be displayed on the LCD 5 or can be recorded by means of the printer 3.

Figure 3A:
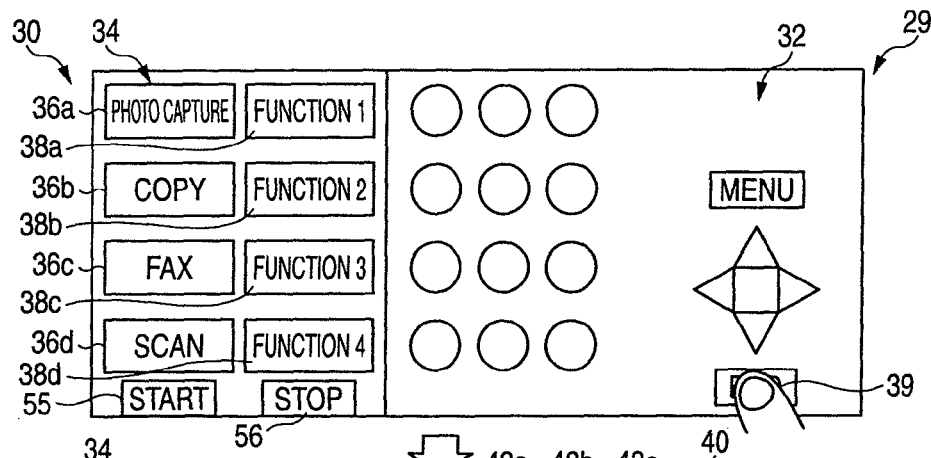
FIGS. 3A to 3D are views showing a transition of a screen displayed on an LCD.

A screen to be displayed on the LCD 5 in the MFP 1 will be described with reference to FIGS. 3A to 3D. FIGS. 3A to 3D are views showing a transition of the screen to be displayed on the LCD 5. As shown in FIG. 3A, the MFP 1 in a standby state displays a menu screen 29. The menu screen 29 includes a set button display region 30 displayed in a left half part of the LCD 5 (an example of an operation image display region) and an operation region 32 displayed in a right half part of the LCD 5.

In the set button display region 30, a plurality of set buttons 34 are displayed. The set buttons 34 corresponds to the operating portion which can be touched by the user. The set buttons 34 are classified into a function button 36 and a customize button 38. In the embodiment, the function buttons 36a-36d and the customize buttons 38a-38d are provided. When the function button 36 is touched by the user, the MFP 1 is switched into a mode for accepting an input of a set value for the function associated with the touched function button 36, and the MFP 1 sets a set value input by the user through the operation key 28 to the set value memory 13a (see FIG. 2).

On the other hand, the customize button 38 is displayed for assigning a desirable set value group to the user. In the case in which a predetermined operation (details will be described below) is carried out for the customize button 38, the MFP 1 sets the set value group assigned to the customize button 38 to the set value memory 13a (see FIG. 2). The customize button 38 is an example of an operating portion described in the claims and also an example of an operation image corresponding to the operating portion. As described above, in the MFP 1 according to the embodiment, the touch panel 7 is provided with the LCD 5. Therefore, the customize button 38 serves as an integrated operating portion and operation image.

In the set button display region 30, a start button 55 for giving an instruction to start a processing and a stop button 56 for giving an instruction to end the processing are displayed.

A user operation for assigning a desirable set value group to the customize button 38 will be schematically described below with reference to FIGS. 3A to 3D. As shown in FIG. 3A, when an edit button 39 displayed on the menu screen 29 is touched by the user, the MFP 1 starts a processing for assigning the set value group to the customize button 38.

First of all, the operating region 32 is erased and a history display region 40 is displayed. The MFP 1 continuously maintains the display of the set button display region 30. Therefore, the set button display region 30 and the history display region 40 are arranged and disposed in a single screen of the LCD 5.

Figure 3B:
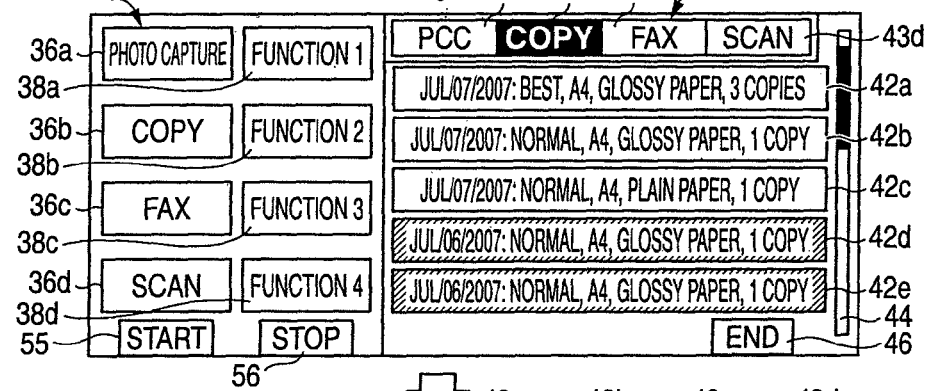

The MFP 1 reads history information stored in the history memory 12b (see FIG. 2). Then the MFP 1 creates the history information button 42 (history information buttons 42a-42e in the illustrated example) corresponding to the respective one of history information and displays the history information button 42 on the history display region 40 such that the user can select the history information. As shown in FIG. 3B, a date of an execution of the function and the set value group used in the execution of the function as the history information are displayed on the history information button 42. The MFP 1 specifies: the history information indicated with the customize button 38 touched by the user; and the history information button 42 touched by the user.

Figure 3C:
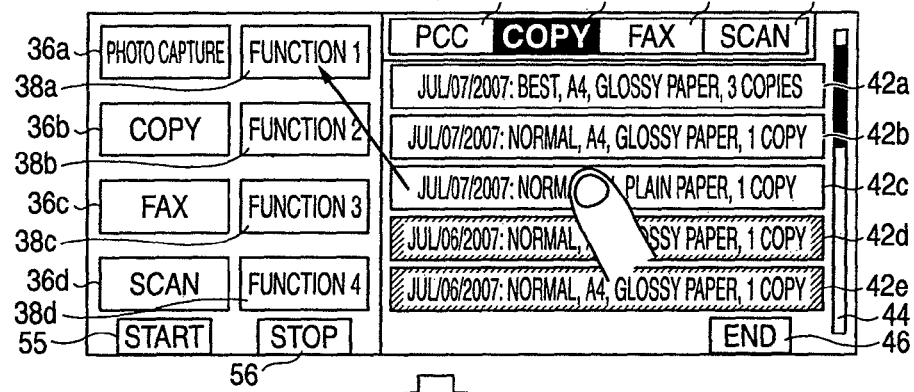

In the embodiment, when it is determined that the user continuously touches from the history information button 42 to any of the customize buttons 38 (that is, a drag operation for dragging a designated position over the screen is carried out) as shown in FIG. 3C, the history information of the touched history information button 42 and the touched customize button 38 are specified. The set value group included in the specified history information is read from the history memory 12b (see FIG. 2) and is assigned to (registered in) the specified customize button 38.

Figure 3D:
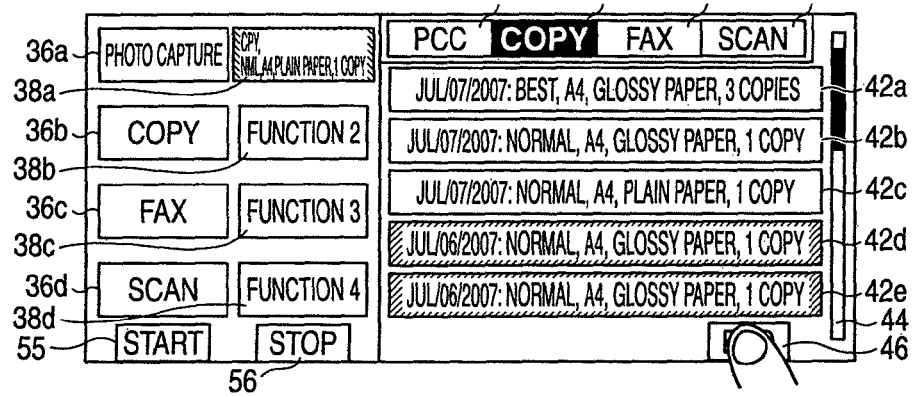

According to the embodiment, the customize buttons 38 and the history information are disposed side by side in the LCD 5 as shown in FIGS. 3B to 3D. Therefore, the user can easily select the customize button 38 from a desirable one of the history information buttons 42, and can associate the history information with a desirable customize button 38 and can assign the set value group included in the history information to the desirable customize button 38 by a simple operation for continuously touching the touch panel 7 from the history information button 42 to the customize button 38.

Further, the customize button 38 and the history information button 42 are organized and displayed on the operating region 32 and the history display region 40, respectively. Therefore, it is possible to display a screen which can easily be seen by the user.

As shown in FIG. 3B, a default such as "function N" (N is an integer of 1 to 4) is displayed on the customize button 38 before the assignment of the set value group, for example. After a desirable set value group is assigned to the customize button 38, the MFP 1 changes the display on the customize button 38. More specifically, information indicating the assigned set value group ("CPY, NML, A4, PLAIN PAPER, ONE COPY" in the example shown in FIG. 3D) is displayed on the customize button 38 (the customize button 38a in the example shown in FIG. 3D), which indicates that the set value group has already been assigned to the customize button 38 (the customize button 38a). The display on the customize button 38a shown in FIG. 3D indicates that the set value group "COPY, NORMAL, A4, 1" is assigned to the customize button 38a.

Accordingly, the user can grasp the set value group assigned to the customize button 38 and can easily select the customize button 38 to which an intended set value group is assigned. Moreover, the MFP 1 is configured to change a display color of the customize button to which the set value group is assigned. In FIG. 3, hatching is applied to the customize button, thereby representing a difference in the display color.

The history display region 40 will be described in detail. A function selecting key 43 and a scroll bar 44 are mainly displayed on the history display region 40 in addition to the history information button 42. As shown in FIGS. 3B to 3D, the function selecting key 43 is configured to allow the user to select the history information about any of the functions which is to be displayed in the history display region 40. In the illustrative example, the function selecting keys 43a-43d are prepared for the photocapture function, the copy function, the facsimile function and the scanner function which can be executed by the MFP 1, respectively. In FIGS. 3B to 3D, "PCC" is indicated on the function selecting key 43a for selecting the photocapture function.

When the function selecting keys 43 are touched by the user so that any of the functions is selected, the MFP 1 switches a display target in the history display region 40 into the history information button 42 for the history information about the selected function. For example, if the COPY is selected, the history information button 42 for the copy function is displayed in the history display region 40. Accordingly, the user can read the history information for each function and can rapidly find the history information which is intended.

When a large number of history information are stored in the history memory 12b (see FIG. 2), all of the history information buttons 42 indicating of the history information may not be displayed at a time. In these cases, the MFP 1 displays the scroll bar 44 in the history display region 40. When the scroll bar 44 is operated by the user, the display target for the history information is switched in order corresponding to the operation. Thus, the user can read the large number of history information.

The MFP 1 disposes and displays the history information buttons 42 in reverse chronological order regarding the time at the execution of the functions included in the history information buttons 42. Accordingly, the user can rapidly find the intended history information depending on the date and time when the function is executed.

The MFP 1 distinguishes and displays the history information button 42 in a different manner (for example, in a different display color) for each function executing date in accordance with the date and time for the execution of the function which is included in the history information button 42. Thus, the user can find the intended history information more easily.

When an end button 46 displayed in the history display region 40 is touched by the user, a processing for assigning the set value group to the customize button 38 is ended and the process returns to the display of the menu screen 29.

Next, the customize button 38 to which the set value group has been assigned will be described with reference to FIGS. 4A to 4D. FIGS. 4A to 4D are views showing a user operation for the customize button 38 and which processing is to be executed in the MFP 1 as a result of the user operation.

As shown in FIGS. 4A and 4B, when the customize button 38 is double-clicked by the user while the menu screen 29 is displayed, the MFP 1 reads the set value group assigned to the double-clicked customize button 38 and sets the set value group to the set value memory 13a (see FIG. 2). Accordingly, the MFP 1 executes the function by using the set value group. For example, FIGS. 4A and 4B show an example in which the customize button 38a to which the set value group "COPY, NORMAL, A4, 1" is assigned is double-clicked. In this case, "COPY" is set to be the set value of the set item "FUNCTION" indicating which function is to be executed through the set value group, "Normal" is set to be the set value of the set item "Picture Quality", "A4" is set to be the set value of the set item "Paper Size", "Normal" is set to be the set value of the set item "Paper Quality", and "1" is set to be the set value of the number of copies, and the copy function is executed in accordance with the set value group. Accordingly, a desirable set value group can be rapidly set by a very slight operation for the user, thereby starting the execution of the function. As shown in FIG. 4B, the MFP 1 displays, during the execution of the function, the indication in which the function is being executed on the LCD 5.

On the other hand, when the customize button 38 is single-clicked by the user, the MFP 1 reads the set value group assigned to the single-clicked customize button 38 and displays a changed screen 49 on the LCD 5.

As shown in FIGS. 4C and 4D, the changed screen 49 includes a confirmation region 50 indicating a set value 52 constituting the read set value group and a corresponding set item 54, and a change input region 53 for allowing the user to input a set value to be changed.

The start button 55 and the stop button 56 displayed on the menu screen 29 are continuously maintained to be displayed in the change input region 53. When the start button 55 is touched by the user, the MFP 1 executes the function in accordance with the set value group displayed on the confirmation region 50 at that time. On the other hand, when the stop button 56 is touched, the change of the set value group is cancelled and the process returns to the display of the menu screen 29 shown in FIG. 4A.

When the set value 52 displayed on the confirmation region 50 is touched, the MFP 1 can change only the touched set value 52. For instance, in the example shown in FIGS. 4B and 4C, the set value 52d of "the number of copies" is touched so that the change can be carried out. Thereafter, the user inputs the set value through the change input region 53, so that only the set value selected by the user can individually changed to be the input set value. For instance, in the example shown in FIGS. 4B and 4C, the set value 52 of "the number of copies" is changed from "1" to "2".

When the set value group is changed and then the start button 55 included in the change input region 53 is touched by the user, the MFP 1 executes the function by using the set value group which is set to the set value memory 13a, that is, the set value group which is changed in accordance with an instruction of the user.

Consequently, the user can easily set a desirable set value group by: selecting and single-clicking any of the displayed customize buttons 38 to which a set value group close to the set value group to be set is assigned; and individually changing only any of the set values to be changed in the selected set value group.

According to the MFP 1 of the embodiment, the user can rapidly set the same set value group many times by using the customize button 38 to which the set value group is assigned, and an excellent operability can be obtained. An operation for double-clicking the customize button 38 or an operation for single-clicking the customize button 38 and then touching the start button 55 without changing the set value group is an example of the predetermined operation described.

FIGS. 5A to 5E are diagrams typically showing a structure of the function table 12c. As shown in FIGS. 5A to 5E, the function table 12c is configured to store which set value group is assigned every customize button 38.

As described in the above with reference to FIGS. 3A to 3D, for example, in the case in which the customize button 38a (to which a name of "customize button 1" is given in the function table 12c) and history information about a set value group of "Copy, best (best mode), A4, plain paper (Plain), 1" are specified, a set value group of the specified history information is stored in the function table 12c corresponding to the name of "customize button 1" of the customize button 38 to be an assigning destination.

Figure 5A:
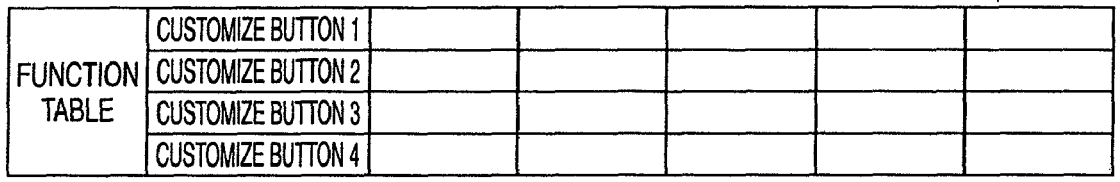
FIGS. 5A to 5E are diagrams typically showing a function table.
Figure 5B:
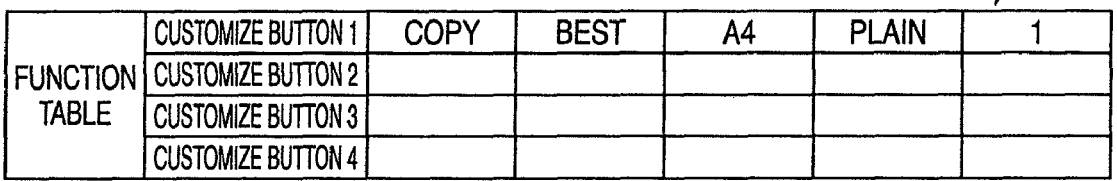
Figure 5C:
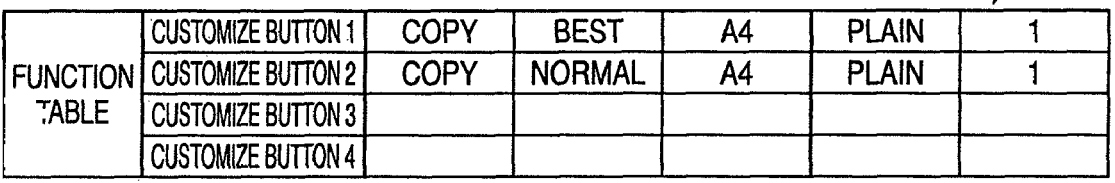
Figure 5D:
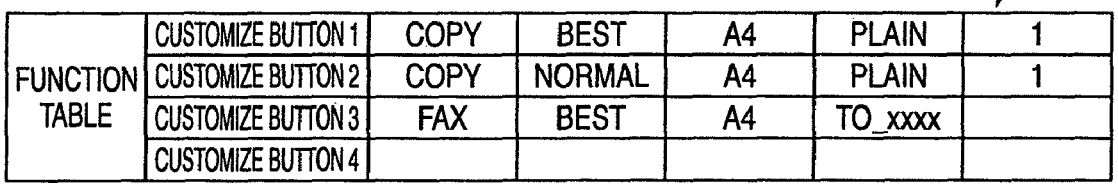
Figure 5E:
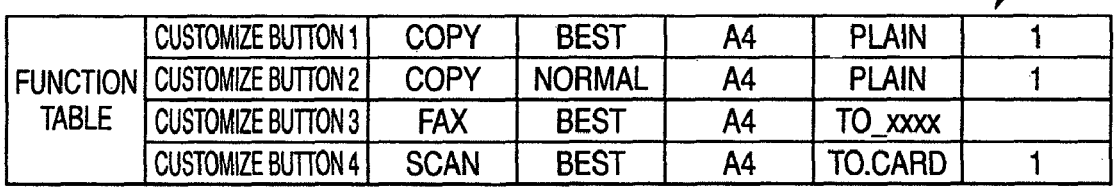

In the set value group stored in the function table 12c shown in FIGS. 5D and 5E, "to_xxxx" indicates a transmitting destination in the execution of the facsimile function, and "to. card" indicates that a transmitting destination of data read in the execution of the scan function is a memory card.

As shown in FIGS. 5A to 5E, each of the set value groups includes a set value of a set item "function" indicative of any of the functions to be executed by using the own set value group. Accordingly, the MFP 1 can discriminate any of the functions to be executed through each set value group in accordance with the set value.

Figure 6:
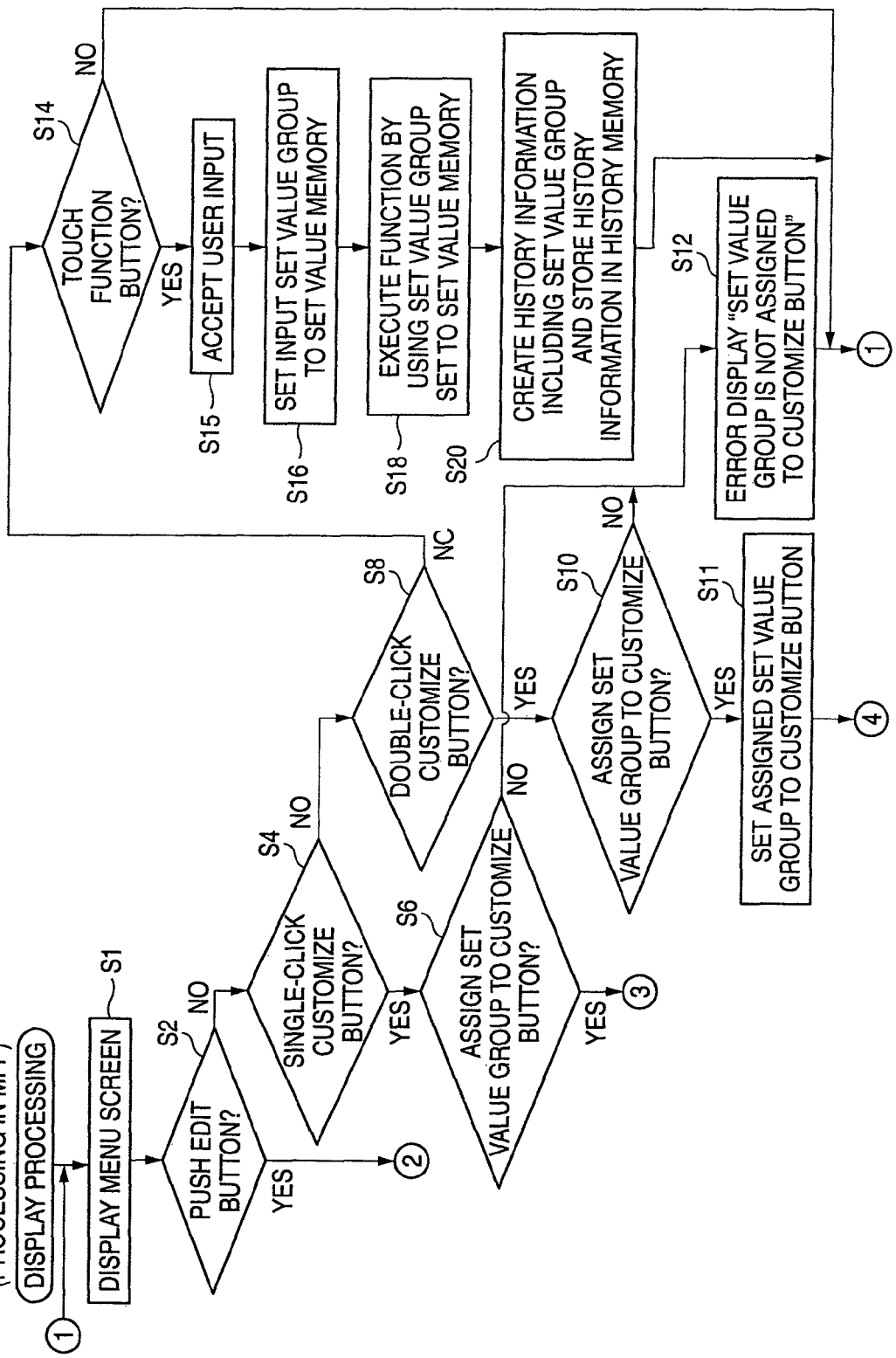
FIG. 6 is a flowchart showing a display processing to be executed by the MFP.

FIG. 6 is a flowchart showing a display processing to be executed by the MFP 1. The display processing is started after a power of the MFP 1 is turned ON.

First of all, the menu screen 29 (see FIG. 3A) is displayed on the LCD 5 (S1). Then, it is determined whether the edit button 39 is pushed or not (S2). If the determination of the S2 is positive (S2: Yes), a transition to a processing for assigning a set value group to the customize button 38 is carried out and details will be described with reference to FIG. 7.

On the other hand, if the decision of the S2 is negative (S2: No), it is determined whether the customize button 38 is single-clicked or not (S4). If the determination of the S4 is positive (S4: Yes), it is subsequently determined whether the set value group is assigned to the customize button or not (S6). If the determination of the S6 is positive (S6: Yes), the set value group assigned to the single-clicked customize button 38 is read, and a transition to a processing for varying a change for the set value group in accordance with an instruction of the user is carried out, and details will be described with reference to FIG. 8A.

On the other hand, if the determination of the S4 is negative (S4: No), it is determined whether the customize button 38 is double-clicked or not (S8). If the determination of the S8 is positive (S8:Yes), it is determined whether the set value group is assigned to the customize button 38 or not (S10). If the determination of the S10 is positive (S10: Yes), the set value group assigned to the customize button 38 is read from the function table (see FIGS. 5A to 5E) and is set to the set value memory 13*a* (see FIG. 2). A transition to a processing for executing the function is then carried out, and details will be described with reference to FIG. 8B.

If the set value group is not assigned to the customize button 38 which is single-clicked or double-clicked, the determination of the S6 becomes negative (S6: No) or the determination of the S10 becomes negative (S10: No). For this reason, an error message (for example, "The set value group is not assigned to the customize button") is displayed on the LCD 5 (S12), and a return to the display of the menu screen 29 is then performed (S1).

On the other hand, if the determinations of the S2, S4 and S8 are negative (S2, S4, S8: No), it is subsequently determined whether the function button 36 is touched or not (S14). If the determination of the S14 is negative (S14: No), the return to the display of the menu screen 29 is carried out. If the determination of the S14 is positive (S14: Yes), an input of a set value through the user is accepted (S15), and a set value group input by the user is set to the set value memory 13*a* (see FIG. 2) (S16).

Then, any of the photocapture function, the copy function, the facsimile function and the scan function is executed by using the set value group (S18). If the function is executed through the set value group which is set by the user without utilizing the customize button 38, history information including the set value group set to the set value memory 13*a* is then created and stored in the history memory 12*b* (S20), and the return to the display of the menu screen 29 is carried out. Consequently, it is possible to subsequently display, as the history information, the set value group which is set without using the customize button 38. As a result, the user can assign the set value group once input to the customize button 38 through a simple operation by utilizing the history information and can be released from a complicatedness caused by inputting the same set value group many times.

Figure 7:
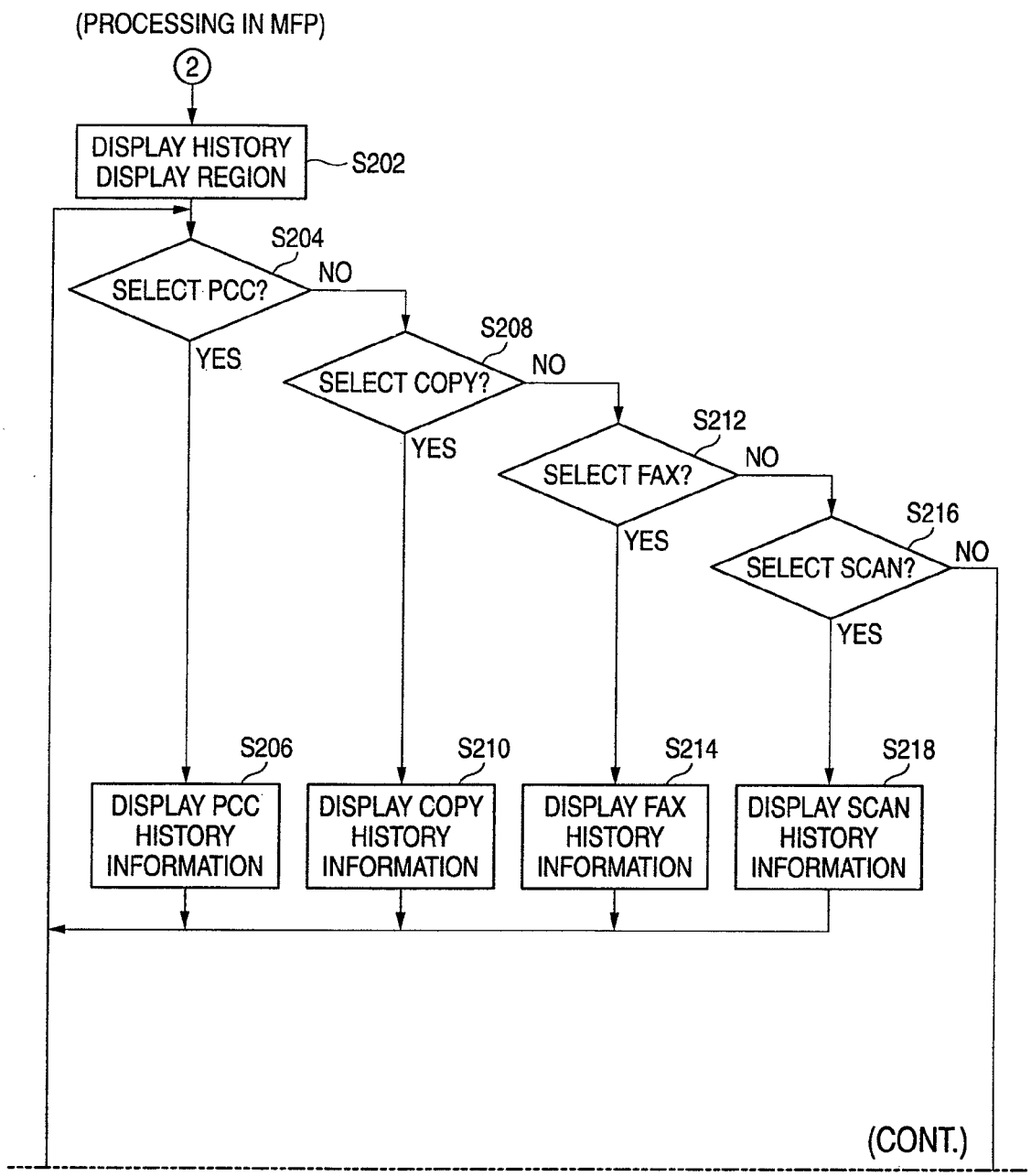
FIG. 7 is a flowchart showing a part of display processings corresponding to a process for assigning a set value group to the customize button.

FIG. 7 is a flowchart showing a part of the display processings corresponding to a process for assigning the set value group to the customize button 38. First of all, the history display region 40 (see FIG. 3B) is displayed in a right half part of the display screen of the LCD 5 (S202). Consequently, the set button display region 30 and the history display region 40 are displayed side by side on the LCD 5.

In the initial state, only history information about one function (for example, the facsimile function) is displayed as a default function in the history display region 40. However, when the function selecting key 43 is touched by the user so that any of the functions is selected, the MFP 1 switches a display target in the history display region 40 into history information about the selected function.

More specifically, it is first determined whether the photocapture (PCC) function is selected or not (S204). If the determination of the S204 is positive (S204:Yes), history information about the photocapture function is displayed (S206) and the process returns to the processing of the S204. On the other hand, if the determination of the S204 is negative (S204: No), it is then determined whether the copy function is selected or not (S208).

If the determination of the S208 is positive (S208: Yes), history information about the copy function is displayed (S210) and the process returns to the processing of the S204. On the other hand, if the determination of the S208 is negative (S208: No), it is thereafter determined whether the facsimile function is selected or not (S212).

If the determination of the S212 is positive (S212: Yes), history information about the facsimile function is displayed (S214) and the process returns to the processing of the S204. On the other hand, if the determination of the S212 is negative (S212: No), it is subsequently determined whether the scan function is selected or not (S216).

If the determination of the S216 is positive (S216: Yes), history function about the scan function is displayed (S218) and the process returns to the processing of the S204.

When the user finds desirable history information to end the touch of the function selecting key 43 while thus repeating the processing, the determination of the S216 is negated (S216: No). Therefore, it is subsequently determined whether the end button 46 (see FIG. 3) is touched or not (S220). If the determination of the S220 is positive (S220: Yes), the processing for assigning the set value group to the customize button 38 is ended and the process return to the display of the menu screen 29 (S1).

On the other hand, if the determination of the S220 is negative (S220: No), it is subsequently determined whether a dragging operation is carried out over a portion from the history information button 42 displayed on the history information display screen 40 to the customize button 38 displayed in the set button display region 30 (see FIGS. 3B to 3D) or not. If the determination of the S222 is negative (S222: No), the return to the processing of the S204 is carried out. If the determination of the S222 is positive (S222: Yes), history information of the history information button 42 placed on a start point of the dragging operation and the customize button 38 placed on an end point of the dragging operation are then specified (S224).

Next, it is determined whether the set value group has already been set to the specified customize button 38 or not (S226). If the determination of the S226 is negative (S226: No), the set value group included in the specified history information is registered in a region of the function table 12*c* reserved for the specified customize button 38. Consequently, the set value group is assigned to the specified customize button 38 (S228). Then, a display on the customize button 38 is changed into information indicating the assigned set value group and a display color of the customize button 38 is changed (S230), and the return to the processing of the S204 is carried out.

On the other hand, if the determination of the S226 is positive (S226: Yes), a notice that the set value group has already been assigned is given to the customize button 38. More specifically, the message indicating that the set value group assigned to the customize button 38 may be overwritten is displayed on the LCD 5, and an inquiry about whether the overwrite is acceptable is given to the user (S232). Next, it is determined whether the user inputs Yes for the inquiry or not (S234). If the determination of the S234 is negative (S234: No), the return to the processing of the S204 is carried out. If the determination of the S234 is positive (S234: Yes), a transition to the processing of the S228 is carried out. Thus, the overwrite not intended by the user can be prevented from being caused by an operation error.

According to the processing shown in the flowchart of FIG. 7, the user can easily utilize the history information to assign the set value group set in the past to the customize button 38.

Figure 8A:
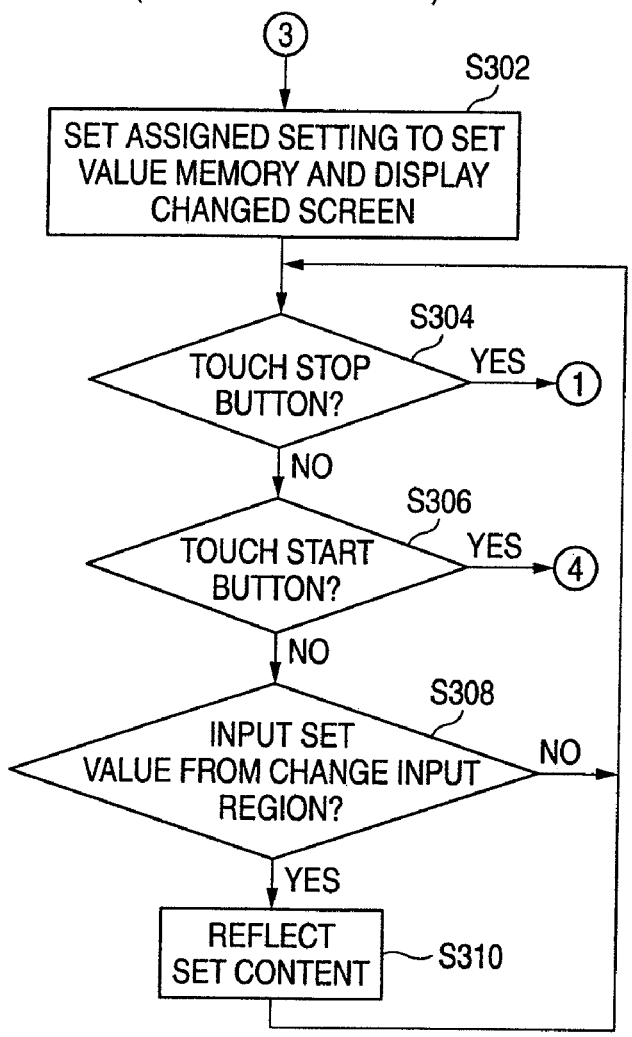
FIG. 8A is a flowchart showing any of the display processings which is to be executed in the case in which the customize button is single-clicked.

FIG. 8A is a flowchart showing a part of the display processings which is to be carried out when the customize button 38 is single-clicked. When the customize button 38 is single-clicked, the set value group assigned to the customize button 38 is first read from the function table 12c (see FIGS. 5A to 5E) and is displayed on the changed screen 49 (S302).

Next, it is determined whether the stop button 56 displayed on the changed screen 49 (see FIGS. 4C and 4D) is touched or not (S304). If the determination of the S304 is positive (S304: Yes), a transition to the processing of the S1 shown in FIG. 6 is carried out and the process returns to the display of the menu screen 29. On the other hand, if the determination of the S304 is negative (S304: No), it is then determined whether the start button 55 is touched by the user or not (S306).

If the determination of the S306 is negative (S306: No), it is then determined whether any of the set values is touched in the confirmation region 50 and then the set value is input from the change input region 53 or not (S308).

If the determination of the S308 is positive (S308: Yes), set contents input through the user are reflected on the set value memory 13a and the display in the LCD 5 (S310). Subsequently, a return to the processing of the S304 is carried out.

If the determination of the S306 is positive while the processing is thus repeated (S306: Yes), the MFP 1 executes any of the functions by using the set value group which is set to the set value memory 13a.

Figure 8B:
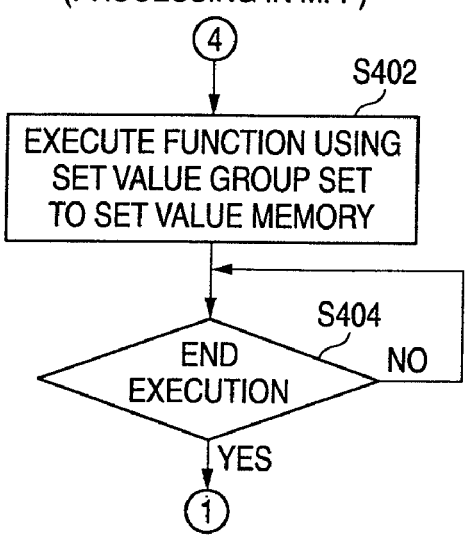
FIG. 8B is a flowchart showing any of the display processings which is to be executed in the case in which the customize button is double-clicked or the case in which the customize button is single-clicked and a start button is then touched.

FIG. 8B is a flowchart showing a part of the display processings which is to be executed when the customize button 38 is double-clicked or when the customize button 38 is single-clicked and the start button 55 is then touched.

As shown in FIG. 8B, the MFP 1 executes any of the photocapture function, the copy function, the facsimile function and the scan function by using the set value group which is set to the set value memory 13a (S402). In the case in which the customize button 38 is double-clicked or the case in which the customize button 38 is single-clicked and the start button 55 is touched without a change in the set value, the function is executed in accordance with the set value group assigned to the customize button 38 because the set value group assigned to the customize button 38 is set. On the other hand, in the case in which the customize button 38 is single-clicked and the set value is changed, the function is executed in accordance with the set value group thus changed.

Next, it is determined whether the execution of the function is ended or not (S404). A standby state is maintained until the execution of the function is ended while the determination of the S404 is negative (S404: No). When the determination of the S404 is positive (S404: Yes), the transition to the processing of the S1 shown in FIG. 6 is carried out and the process returns to the display of the menu screen 29.

According to the MFP 1 of the first embodiment, the customize button 38 and the history information button 42 are displayed together on the LCD 5. Therefore, the user can associate the history information with the customize button 38, thereby assigning the set value group to the desirable customize button 38 by a simple operation for selecting the desirable history information button 42 and customize button 38 from the history information buttons 42 and the customize buttons 38 which are displayed and continuously touching the touch panel 7 from the history information button 42 to the customize button 38.

A second embodiment will be described with reference to FIGS. 9A to 9C. The first embodiment describes the example in which the MFP 1 specifies the history information and the customize button 38 by carrying out the dragging operation from the history information button 42 to the customize button 38 which are displayed on the LCD 5 through the user. On the other hand, in an MFP 1 according to the second embodiment, it is assumed that the user individually touches a history information button 42 and a customize button 38 which are displayed on an LCD 5, thereby specifying history information and the customize button 38.

Description will be given on the assumption that external and electrical structures of the MFP 1 according to the second embodiment are identical to those of the MFP 1 according to the first embodiment. Moreover, a screen displayed on the LCD 5 of the MFP 1 according to the second embodiment is almost identical to the screen displayed on the LCD 5 of the MFP 1 according to the first embodiment, and only an operating procedure for specifying the history information button 42 and the customize button 38 and a timing for displaying a history display region 40 are different. The same portions as those in the first embodiment have the same reference numerals and description thereof will be omitted, and differences from the first embodiment will be described.

Figure 9A:
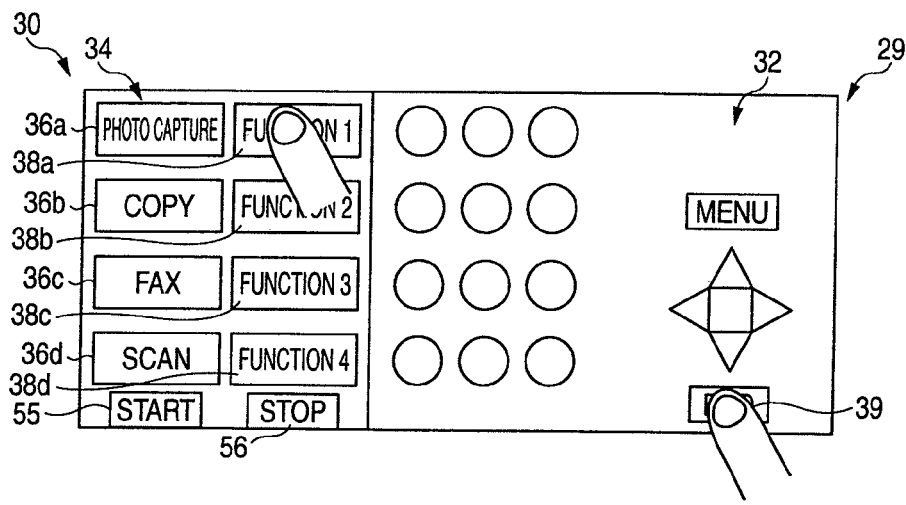
FIGS. 9A to 9C are views showing a transition of a screen displayed on a touch panel of an MFP according to a second embodiment.
Figure 9B:
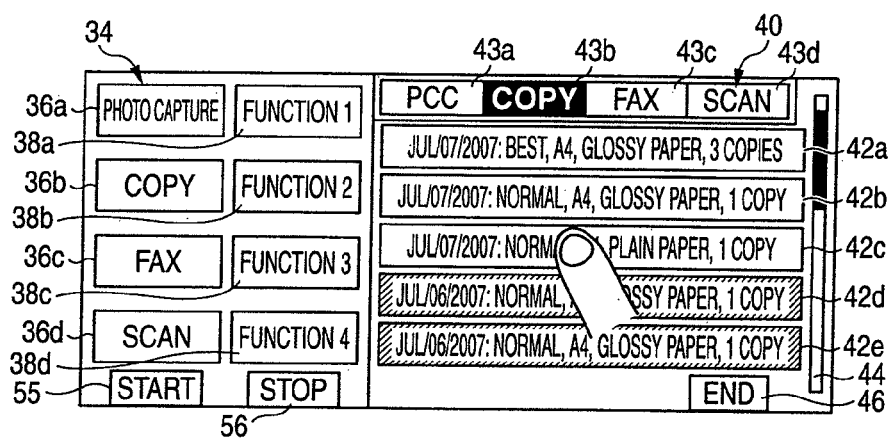
Figure 9C:
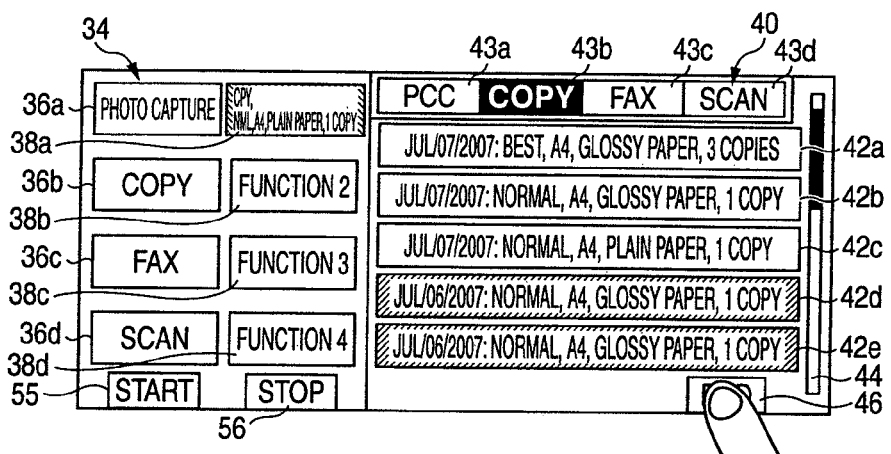

FIGS. 9A to 9C are views showing a transition of a screen displayed on the LCD 5 of the MFP 1 according to the second embodiment. In the same manner as in the first embodiment, when an edit button 39 displayed on a menu screen 29 (see FIG. 9A) is first touched by a user, the MFP 1 starts a processing for assigning a set value group to the customize button 38.

Although the operating region 32 is erased and the history display region 40 is displayed immediately when the edit button 39 is touched by the user in the first embodiment, the operating region 32 is not erased but a display is maintained continuously in the MFP 1 according to the second embodiment.

When the user touches any of the customize buttons 38 and releases a finger therefrom, the MFP 1 specifies the touched customize button 38 as a set value group assigning target button. Then, the MFP 1 erases the operating region 32 and displays the history display region 40 (see FIG. 9B).

After the user touches any of the history information buttons 42 and releases a finger therefrom, the MFP 1 specifies the touched set value group included in history information of the history information button 42 as a set value group to be assigned to the customize button 38 which is specified earlier. By the same processing as that in the first embodiment, subsequently, the specified set value group is assigned to the customize button 38.

Also in the second embodiment, in the same manner as in the first embodiment, the customize buttons 38 and the history information buttons 42 are displayed together on the LCD 5. Therefore, the user can associate the history information with the customize button 38, thereby assigning the set value group to the desirable customize button 38 by a simple operation of: selecting the desirable customize button 38 and history information button 42 from the customize buttons 38 and the history information buttons 42 which are displayed; and touching the selected customize button 38 and the selected history information button 42.

A third embodiment will be described with reference to FIGS. 10A to 10C. In the first and second embodiments, the set button display region 30 and the history display region 40 have the same sizes.

On the other hand, an MFP 1 according to the third embodiment is different from that according to the second embodiment in that a history display region 40 having a larger area than a set button display region 30 is displayed when any of customize buttons 38 is specified.

Description will be given on the assumption that external and electrical structures of the MFP 1 according to the third embodiment are identical to those of the MFPs 1 according to the first and second embodiments. Moreover, an operating procedure and a timing for displaying the history display region 40 in the MFP 1 according to the third embodiment are identical to those of the MFP 1 according to the second embodiment. The same portions as those in the first and second embodiments have the same reference numerals and description thereof will be omitted, and differences from the second embodiment will be described.

Figure 10A:
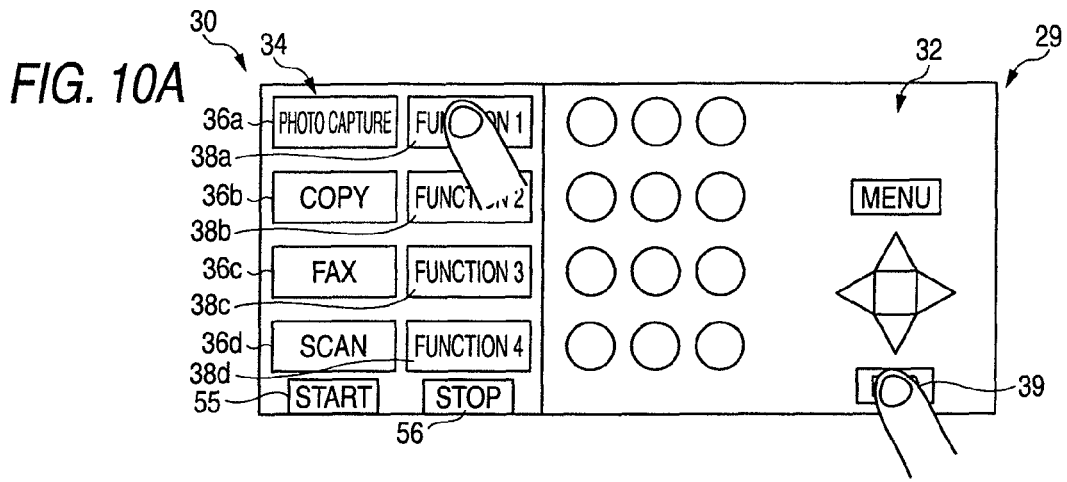
FIGS. 10A to 10C are views showing a transition of a screen displayed on a touch panel of an MFP according to a third embodiment.
Figure 10B:
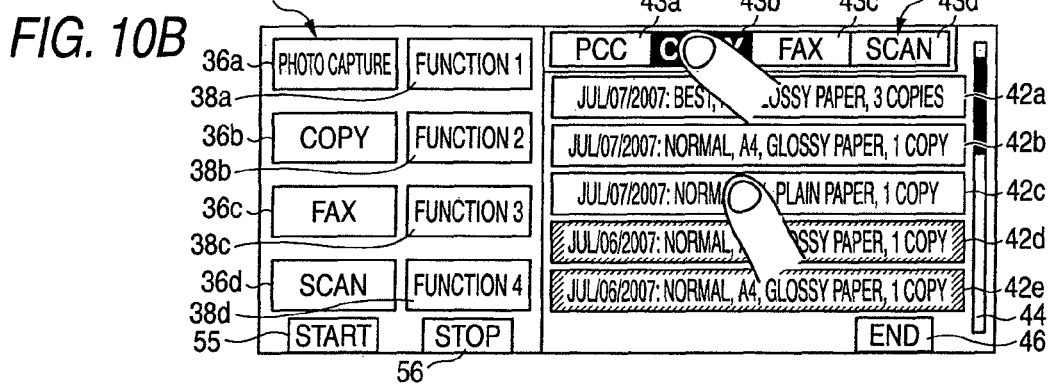
Figure 10C:
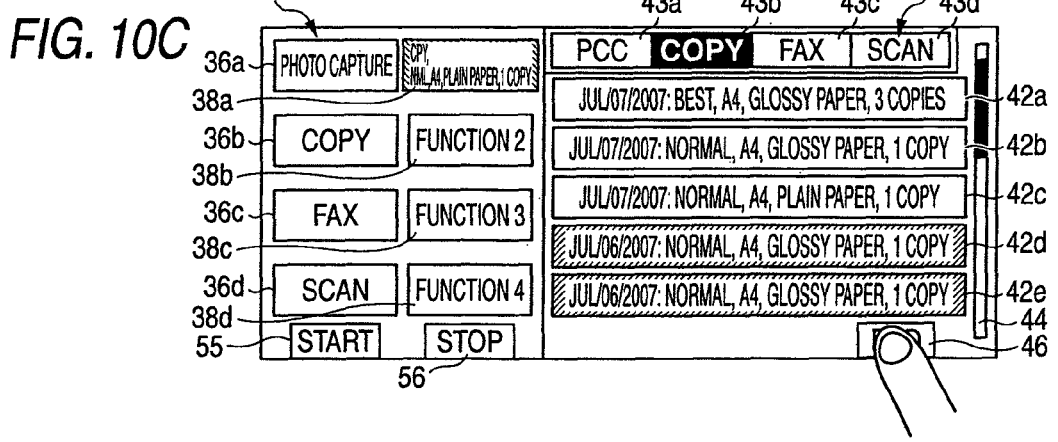

FIGS. 10A to 10C are views showing a transition of a screen displayed on an LCD 5 of the MFP 1 according to the third embodiment. In the same manner as in the second embodiment, when an edit button 39 displayed on a menu screen 29 is first touched by a user (see FIG. 10A), the MFP 1 starts a processing for assigning a set value group to the customize button 38.

In the second embodiment, when the user touches any of the customize buttons 38 (see FIG. 10A) and releases a finger therefrom, the MFP 1 specifies the same customize button 38 and erases an operating region 32, and displays the history display region 40. In addition, in the third embodiment, the set button display region 30 is reduced and the history display region 40 having a larger area than the set button display region 30 thus reduced is arranged as shown in FIG. 10B.

Thus, it is possible to display the customize button 38 to be easily seen in a large space until the customize button 38 is specified. Further, after the customize button 38 is specified, a large space is maintained for the history display region 40, consequently, history information is displayed to be easily seen. Therefore, the user can easily find and designate the desirable customize button 38 and history information.

According to the third embodiment, furthermore, when the display in the set button display region 30 is reduced, only a width of a function button 36 in a set button 34 displayed in the set button display region 30 is decreased. During the execution of the processing for assigning the set value group to the customize button 38, the user hardly requires the display of the function button 36. Therefore, a drawback is hardly caused even if the function button 36 having reduced size thereof is displayed.

While the invention has been described above based on the embodiments, the invention is not limited to the embodiments but it is possible to easily guess that various improvements and changes can be made without departing from the scope of the invention.

For example, in the first to third embodiments, the customize button 38 is displayed in different display colors depending on whether the set value group is assigned or not. Instead, the display color of the customize button 38 may be made different every function. Moreover, the MFP 1 may rearrange the customize buttons 38 for every function.

Figure 11A:
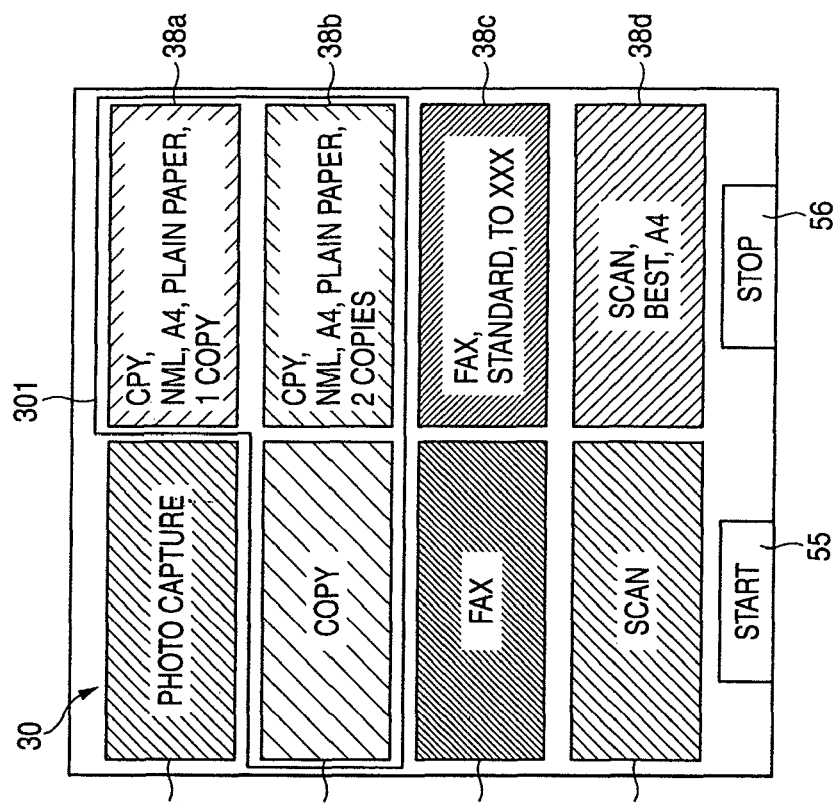
Figure 11B:
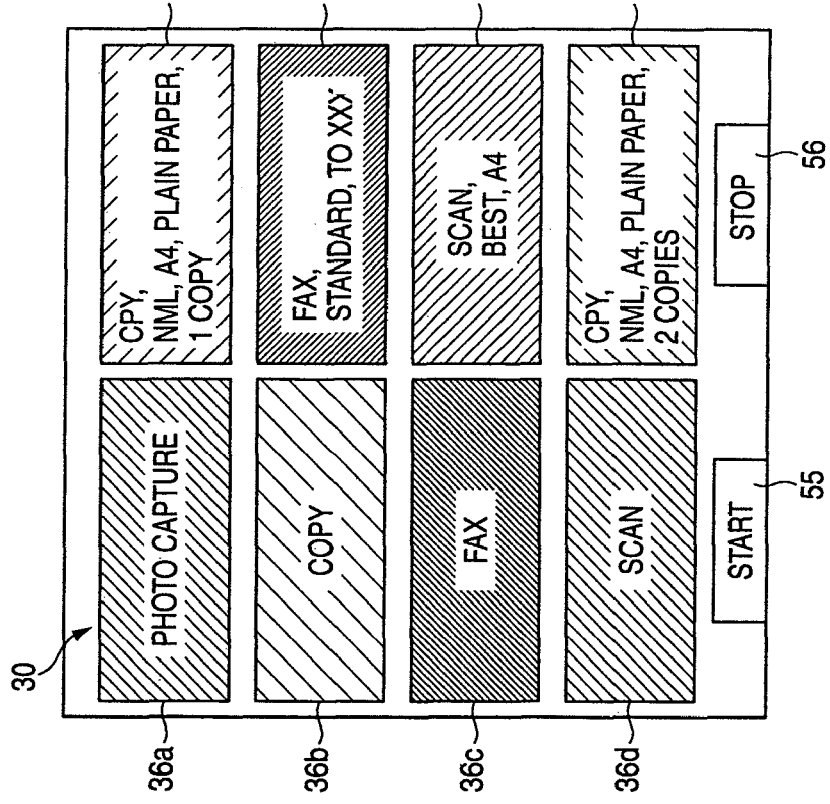

FIGS. 11A and 11B show a set button display region 30 according to modified embodiments, in which FIG. 11A shows the set button display region 30 in which a customize button 38 is classified by a color for each function and FIG. 11B shows the set button display region 30 in which the customize button 38 is rearranged for each function. Since the drawings cannot be expressed in the color, a difference in the display color is represented by a difference in hatching applied to the customize button 38 in FIGS. 11A and 11B.

As shown in FIG. 11A, the customize button 38 to which a set value group is assigned is displayed in a different display color every function to be executed by using the assigned set value group. Consequently, a user can rapidly find the customize button 38 which is coincident with the function to be executed. As shown in FIG. 11A, a function button 36 may also be displayed with a classification by a color. In place of the classification by the color for each function, for example, a shape of the customize button 38 may be made different every function, or a display pattern of the customize button 38 may be made different every function.

In FIG. 11B, the customize button 38 to which the set value group is assigned is displayed in a collecting arrangement for each function to be executed by using the assigned set value group. Consequently, the user can rapidly find the customize button 38 which is coincident with the function to be executed. As shown in FIG. 11B, a partition indication 301 may be displayed on the LCD 5 for partitioning, for each function, a region in which the function button 36 and the customize button 38 are disposed.

Although the set button display region 30 and the history display region 40 are displayed in almost uniform areas in the first and second embodiments, the areas do not need to be equal to each other. For example, the history display region 40 may be displayed in a larger area than the set button display region 30. Consequently, the user can visually recognize history information displayed on the history information button 42 more easily.

Although the description has been given on the assumption that the operating portion and the operation image are constituted integrally as the customize button 38 in the embodiments, the operating portion and the operation image may be separately provided.

In this case, the operating key 28 is previously correspond one-on-one to the customize button 38 displayed on the LCD 5. For example, in the case in which a key for inputting "1" of a ten key which is one of the operating keys 28 corresponds to one of the customize buttons 38, history information is assigned to the key for inputting the "1" of the ten key which is previously correspond to the customize button 38 when the customize button 38 and the history information are specified. When the user then manipulates the key, the function is executed in accordance with the set value group assigned to the key. In this configuration, it is possible to exhibit similar advantages as those of the MFPs 1 according to the first to third embodiments.

The description has been given by taking, as an example, the MFP 1 as a multi function device as an information processing apparatus in the first to third embodiments. However, the invention can be applied to other peripheral devices such as a printer or a scanner.

According to the embodiments of the invention, in a first aspect, there is provided an information processing apparatus comprising: a setting unit configured to set a set value group containing a combination of set values of various set items; an executing unit configured to execute a function using the set value group set by the setting unit; a history storing unit configured to store history information including the set value group having been used in an execution of the function by the executing unit; a displaying unit configured to display the history information and an operation image corresponding to respective operating portions configured to receive an instruction from a user; a specifying unit configured to specify history information and operation image designated by the user from the history information and the operation image displayed by the displaying unit; and an assigning unit configured to assign a set value group corresponding to the history information specified by the specifying unit to the operating portion corresponding to the operation image specified by the specifying unit, wherein, when a predetermined operation is carried out for the operating portion corresponding to the operation image, the setting unit sets the set value group assigned to the operating portion.

In a second aspect, there is provided the information processing apparatus according to the first aspect, wherein the displaying unit displays information indicating the assigned set value group on the operation image corresponding to the operating portion to which the set value group has been assigned by the assigning unit.

In a third aspect, there is provided the information processing apparatus according to the first or second aspect, wherein the displaying unit arranges and disposes in a single screen, an operation image display region in which the operation image is displayed and a history display region in which the history information is displayed.

In a fourth aspect, there is provided the information processing apparatus according to the third aspect, wherein the executing unit is operable to execute plural kinds of functions, wherein the history storing unit is configured to store, for each set value group, the function which the set value group is used for executing, and wherein said information processing apparatus further comprises: a switching unit configured, when one of the functions is selected, to switch a display target in the history display region into history information including a set value group to be used by the selected function.

In a fifth aspect, there is provided the information processing apparatus according to the fourth aspect, wherein the displaying unit displays the operation image corresponding to the operating portion to which the set value group is assigned by the assigning unit in a collecting arrangement for each function to be executed by using the assigned set value group.

In a sixth aspect, there is provided the information processing apparatus according to the fourth or fifth aspect, wherein the displaying unit displays the operation image corresponding to the operating portion to which the set value group is assigned by the assigning unit in a different display manner for each function to be executed by using the assigned set value group.

In a seventh aspect, there is provided the information processing apparatus according to any one of the third to sixth aspects, wherein the displaying unit reduces an area of the operation image display region when the operation image displayed in the operation image display region is specified by the specifying unit, and the displaying unit arranges and disposes, in the operation image display region, the history display region having an area larger than that of the operation image display region.

In an eighth aspect, there is provided the information processing apparatus according to any one of the first to seventh aspects, wherein the displaying unit displays the history information and the operation image on a displaying portion, wherein said information processing apparatus comprises a touch panel configured to detect a position of a designating object on a displaying surface of the displaying portion as a position designated from an outside when the designating object contacts or is close to the position, such that the operation image and the operating portion are integrated in the touch panel, and wherein, when the touch panel detects a continuous detection of the designating object moving from a first display position of the history information in the displaying portion to a second display position of the operation image based on a result of the detection through the touch panel, the specifying unit specifies the history information and the operation image designated by the user as the history information located at the first display position and the operation image located at the second display position.

In a ninth aspect, there is provided the information processing apparatus according to any one of the first to eighth aspects, further comprising a changing unit configured to individually change set values contained in a set value group assigned to a selected operating portion in accordance with the instruction of the user, wherein the setting unit sets the set value group changed by the changing unit.

In a tenth aspect, there is provided the information processing apparatus according to any one of the first to ninth aspects, further comprising a notifying unit configured, when the set value group has been assigned to the operating portion corresponding to the specified operation image, to issue a notice that the set value group has been assigned to the operating portion corresponding to the operation image specified by the specifying unit.

According to the information processing apparatus of the first aspect, the history information including the set value group stored in the history storing unit is displayed together with the operation image corresponding to the operating portion which can be designated by the user. When any of the history information and the operation images displayed by the displaying unit and designated by the user are specified, the set value group corresponding to the specified history information is assigned to the operating portion corresponding to the specified operation image. In the case in which a predetermined operation is carried out for the operating portion corresponding to the operation image, the set value group assigned to the operating portion is set.

Accordingly, the user can easily assign a desirable set value group to the operating portion in the set value group set in the past, and can then set the same set value group rapidly by using the operating portion. Accordingly, an excellent operability can be obtained for the user.

According to the information processing apparatus of the second aspect, in addition to the advantages of the information processing apparatus of the first aspect, the information indicative of the assigned set value group is displayed on the operation image corresponding to the operating portion to which the set value group has been assigned by the assigning unit. Therefore, the user can grasp the set value group assigned to the operating portion while seeing the operation image and can select the operating portion to which an intended set value group is assigned.

According to the information processing apparatus of the third aspect, in addition to the advantages of the information processing apparatus according to the first or second aspect, the operation image and the history information are readjusted and displayed. Therefore, a screen capable of being seen easily by the user can be displayed.

According to the information processing apparatus of the fourth aspect, in addition to the advantages of the information processing apparatus according to the third aspect, the display target in the history display region is switched into the history information including the set value group to be used by the selected function. Therefore, the user can read the history information for each function and can rapidly find the intended history information.

According to the information processing apparatus of the fifth aspect, in addition to the advantages of the information processing apparatus according to the fourth aspect, the displaying unit displays the operation image corresponding to the operating portion to which the set value group is assigned by the assigning unit in a collecting arrangement for each function to be executed by using the assigned set value group. Therefore, the user can rapidly find the operation image which is coincident with the function that is to be executed.

According to the information processing apparatus of the sixth aspect, in addition to the advantages of the information processing apparatus according to the fourth or fifth aspect, the displaying unit displays the operation image corresponding to the operating portion to which the set value group is assigned by the assigning unit in a different display manner for each function to be executed by using the assigned set value group. Therefore, the user can rapidly find the operation image which is coincident with the function that is to be executed.

According to the information processing apparatus of the seventh aspect, in addition to the advantages produced by the information processing apparatus according to any of the third to sixth aspects, in the case in which any of the operation images displayed in the operation image display region is specified by the specifying unit, the operation image display region is reduced, and furthermore, the history display region having a larger area than the operation image display region thus reduced is arranged and disposed in the operation image display region. Therefore, it is possible to display the operation image in a large space so as to be easily seen until the operation image is specified. After the operation image is specified, moreover, a large space can be maintained for the history display region and the history information can be displayed to be easily seen. Consequently, the user can easily find and designate an operation image and history information which are desired.

According to the information processing apparatus of the eighth aspect, in addition to the advantages of the information processing apparatus according to any of the first to seventh aspects, in the case in which it is determined that the portion from the display position of the history information displayed on the displaying portion to the display position of the operation image is designated continuously, the history information and the operation image are specified. Therefore, it is possible to produce an advantage that the user can assign the set value group to a desirable operation image by a simple operation for continuously designating the portion from the intended history information to the operation image.

According to the information processing apparatus of the ninth aspect, the same advantage as those of the information processing apparatus according to any of the first to eighth aspects can be obtained. Moreover, the set value of the set value group assigned to the selected operating portion is individually changed in accordance with an instruction of the user. Therefore, the user can easily set a desirable set value group by selecting any of the operating portions to which a close set value group to a set value group to be set is assigned and individually changing only any of the set values constituting the set value group which is to be changed.

According to the information processing apparatus of the tenth aspect, in addition to the advantages of the information processing apparatus according to any of the first to ninth aspects, in the case in which the set value group has been assigned to the operating portion corresponding to the operation image specified by the specifying unit, a notice that the set value group has already been assigned is given. Therefore, it is possible to prevent an operation error of the user.

What is claimed is:

1. An information processing apparatus comprising:
   a setting unit configured to set a set value group containing a combination of set values of various set;
   an executing unit configured to execute a function using the set value group set by the setting unit;
   a history storing unit configured to store history information including the set value group having been used in an execution of the function by the executing unit;
   a displaying unit configured to display the history information and an operation image corresponding to respective operating portions configured to receive an input instruction;
   a specifying unit configured to specify a specific history information and a specific operation image designated from the history information and the operation image displayed by the displaying unit; and
   a determining unit configured to determine whether a specific set value group has been assigned to the operation image specified by the specifying unit;
   an assigning unit configured to assign the specific set value group corresponding to the specific history information specified by the specifying unit to the operating portion corresponding to the specific operation image specified by the specifying unit if the determining unit determines that the specific set value group has not been assigned to the specific operation image,
   wherein, when a predetermined operation is carried out for the operating portion corresponding to the operation image, the setting unit sets the specific set value group assigned to the specific operating portion;
   wherein, when the determining unit determines that the specific set value group has been set to the specific operation image, the determining unit sends a notice that the specific set value group has been assigned to the specific operation image, the notice comprising a display of an inquiry about whether overwriting the specific set value group is acceptable;
   wherein, when an overwriting instruction is received in response to the inquiry, the specific set value group which has been set to the specific operation image is overwritten to the set value group specified by the specifying unit; and
   wherein the displaying unit displays the operation image before the assigning unit assigns the specific set value group to the operation image.

2. The information processing apparatus according to claim 1, wherein the displaying unit displays information indicating the assigned set value group on the operation image corresponding to the operating portion to which the specific set value group has been assigned by the assigning unit.

3. The information processing apparatus according to claim 1, wherein the displaying unit arranges and disposes in a single screen, an operation image display region in which the operation image is displayed and a history display region in which the history information is displayed.

4. The information processing apparatus according to claim 3,
   wherein the executing unit is operable to execute plural kinds of functions,
   wherein the history storing unit is configured to store, for each set value group, the function which the set value group is used for executing, and wherein said information processing apparatus further comprises: a switching unit configured, when one of the functions is selected, to switch a display target in the history display region into history information including a selected set value group to be used by the selected function.

5. The information processing apparatus according to claim 4, wherein the displaying unit displays the operation image corresponding to the operating portion to which the specific set value group is assigned by the assigning unit in a collecting arrangement for each function to be executed by using the assigned set value group.

6. The information processing apparatus according to claim 4, wherein the displaying unit displays the operation image corresponding to the operating portion to which the specific set value group is assigned by the assigning unit in a different display manner for each function to be executed by using the assigned set value group.

7. The information processing apparatus according to claim 3, wherein the displaying unit reduces an area of the operation image display region when the operation image displayed in the operation image display region is specified by the specifying unit, and the displaying unit arranges and disposes, in the operation image display region, the history display region having an area larger than that of the operation image display region.

8. The information processing apparatus according to claim 1,
   wherein the displaying unit displays the history information and the operation image on a displaying portion,
   wherein said information processing apparatus comprises a touch panel configured to detect a position of a designating object on a displaying surface of the displaying portion as a position designated from an outside when the designating object contacts or is close to the position, such that the operation image and the operating portion are integrated in the touch panel, and
   wherein, when the touch panel detects a continuous detection of the designating object moving from a first display position of the history information in the displaying portion to a second display position of the operation image based on a result of the detection through the touch panel, the specifying unit specifies the specific history information and the specific operation image designated as the history information located at the first display position and the operation image located at the second display position.

9. The information processing apparatus according to claim 1, further comprising a changing unit configured to individually change set values contained in a selected set value group assigned to a selected operating portion in accordance with input instructions,
   wherein the setting unit sets the set value group changed by the changing unit.

10. The information processing apparatus according to claim 1, further comprising a notifying unit configured, when the specific set value group has been assigned to the operating portion corresponding to the specific operation image, to issue a notice that the specific set value group has been assigned to the operating portion corresponding to the specific operation image specified by the specifying unit.

11. A method for controlling an information processing apparatus that comprises: a setting unit configured to set a set value group containing a combination of set values of various set items; and an executing unit configured to execute a function using the set value group set by the setting unit, said method comprising:

storing history information including the set value group having been used in an execution of the function by the executing unit;
displaying the history information and an operation image corresponding to respective operating portions configured to receive an input instruction;
specifying a specific history information and a specific operation image designated from the history information and the operation image displayed by a displaying unit;
determining whether a specific set value group has been assigned to the specific operation image;
assigning the specific set value group corresponding to the specific history information to the operating portion corresponding to the specific operation image if determined that the specific set value group has not been assigned to the specific operation image;
setting the specific set value group assigned to the operating portion when a predetermined operation is carried out for the operating portion corresponding to the specific operation image;
sending a notice that the specific set value group has been assigned to the specific operation image, the notice comprising a display of an inquiry about whether overwriting the specific set value group is acceptable, when the specific set value group is determined to be set to the specific operation image;
overwriting the specific set value group, which has been set to the specific operation image, to the set value group specified by the specifying unit, when an overwriting instruction is received in response to the inquiry; and
displaying the operation image before the assigning unit assigns the specific set value group to the operation image.

12. A non-transitory computer-readable storage medium having a computer program stored thereon and readable by a computer, said computer program, when executed by the computer, causes the computer to perform operations for an information processing apparatus that comprises: a setting unit configured to set a set value group containing a combination of set values of various set items; and an executing unit configured to execute a function using the set value group set by the setting unit, said operations comprising:
   storing history information including the set value group having been used in an execution of the function by the executing unit;
   displaying the history information and an operation image corresponding to respective operating portions configured to receive an input instruction;
   specifying a specific history information and a specific operation image designated from the history information and the operation image displayed by a displaying unit;
   determining whether a specific set value group has been assigned to the specific operation image;
   assigning the specific set value group corresponding to the specific history information to the operating portion corresponding to the specific operation image if determined that the specific set value group has not been assigned to the specific operation image;
   setting the specific set value group assigned to the operating portion when a predetermined operation is carried out for the operating portion corresponding to the specific operation image;
   sending a notice that the specific set value group has been assigned to the specific operation image, the notice comprising a display of an inquiry about whether overwriting the specific set value group is acceptable, when the specific set value group is determined to be set to the specific operation image;

overwriting the specific set value group, which has been set to the specific operation image, to the set value group specified by the specifying unit, when an overwriting instruction is received in response to the inquiry; and displaying the operation image before the assigning unit assigns the specific set value group to the operation image.

13. The information processing apparatus according to claim 1, wherein, if a first operation is carried out for the operating portion corresponding to the specific operation image, the assigning unit is changes the specific set value group assigned to the specific operation image; and if a second operation is carried out for the operating portion corresponding to the specific operation image, the setting unit sets the set value group assigned to the operation image and the executing unit executes the function using the set value group set by the setting unit to the operation image.

* * * * *